United States Patent …

(12) United States Patent
Pildner

(10) Patent No.: US 7,715,550 B2
(45) Date of Patent: May 11, 2010

(54) TELEPHONE LINE INTERFACE, SIDE-TONE ATTENUATION CIRCUIT AND METHOD

(75) Inventor: Reinhart K. Pildner, Brampton (CA)

(73) Assignee: Tyco Safety Products Canada Ltd., Concord, Ontario (CA)

(*) Notice: Subject to any disclaimer, the term of this patent is extended or adjusted under 35 U.S.C. 154(b) by 636 days.

(21) Appl. No.: 11/221,965

(22) Filed: Sep. 8, 2005

(65) Prior Publication Data

US 2006/0067520 A1    Mar. 30, 2006

Related U.S. Application Data

(60) Provisional application No. 60/607,989, filed on Sep. 8, 2004.

(51) Int. Cl.
*H04M 1/00* (2006.01)
*H04M 9/00* (2006.01)

(52) U.S. Cl. ...................................... 379/402

(58) Field of Classification Search ................. 379/345, 379/391, 402

See application file for complete search history.

(56) References Cited

U.S. PATENT DOCUMENTS 5,465,298 A * 11/1995 Wilkison et al. ........ 379/406.02

FOREIGN PATENT DOCUMENTS

| DE | 4135790 A1 | 5/1993 |
| JP | 10-327253 | 12/1998 |
| WO | WO 94/07319 | 3/1994 |
| WO | WO 02/093878 A1 | 11/2002 |

OTHER PUBLICATIONS

Clare, Inc.; Linear Optocouplers; Application Note AN-107; Jun. 25, 2002; p. 6; USA.

* cited by examiner

*Primary Examiner*—Alexander Jamal
(74) *Attorney, Agent, or Firm*—Smart & Biggar

(57) ABSTRACT

A telephone line interface and side-tone attenuation circuit includes two opto-electric converters. The first has an input interconnected to receive a signal proportional to a near-end signal, and an output interconnected to modulate a current proportional to the near-end signal onto the subscriber loop. The second has its input interconnected to provide a signal proportional to a current on the subscriber loop, including the current proportional to the near-end signal, at its output. A summing amplifier receives signals proportional to the output voltage of the second opto-electric converter and a signal proportional to the near-end signal. The output voltage of the second opto-electric amplifier includes a component that is substantially 180° out of phase with the near-end signal, allowing the near-end signal to be cancelled at the summing amplifier.

10 Claims, 2 Drawing Sheets

TELEPHONE LINE INTERFACE, SIDE-TONE ATTENUATION CIRCUIT AND METHOD

CROSS-REFERENCE TO RELATED APPLICATIONS

This application claims benefits from U.S. Provisional Patent Application No. 60/607,989 filed Sep. 8, 2004, the contents of which are hereby incorporated herein by reference.

FIELD OF THE INVENTION

The present invention relates generally to telephony interface circuits, and more particularly to side-tone attenuation circuits and methods.

BACKGROUND OF THE INVENTION

Present day telephone networks typically terminate customer premises equipment on a two-wire subscriber loop. The subscriber loop terminals to which customer premises equipment is connected are often referred to as "tip" and "ring". The two-wires are used to receive an analog signal from a far-end transmitter and transmit an analog signal originating at the customer premises to the far-end.

Unfortunately, as bi-directional signals are carried on a single pair of wires, the two sets of signals can interfere with each other. In most applications, bi-directional signals on a single pair of wires do not present much concern. For voice calls, signals in both directions on the wire are simply perceived as two both parties speaking simultaneously.

Bi-directional signals, however, interfere destructively when the phone line is used to simultaneously carry data type signals, and voice. For example, phone lines are at times used to concurrently carry dual tone multi-frequency (DTMF) signals and voice signals. DTMF signals, for example, are typically used to control a customer premises alarm system from a remote monitoring station. Concurrently, a subscriber of the customer premises may speak to the monitoring station. Any portion of the signal that originates with the customer that is cross-coupled with the DTMF signal may interfere with the operation of a DTMF decoder at the customer premises.

Accordingly, local echo cancellation (often referred to as side-tone attenuation) circuits are known. Typically, however, side-tone attenuation circuits are interconnected to the tip and ring of the telephone line using a transformer and a balanced bridge incorporating precision resistors. The ideal bridge for any line is dependent upon the impedance of the line. Changes in the telephone line impedance causes an imbalance in the bridge and results in poorer side-tone attenuation in such circuits.

Therefore, there is a need for an improved side-tone attenuation circuit that is particularly useful in DTMF decoding circuits such as those used in alarm systems.

SUMMARY OF THE INVENTION

A telephone line interface and side-tone attenuation circuit includes two opto-electric converters. The first has an input interconnected to receive a signal proportional to a near-end signal, and an output interconnected to modulate a current proportional to the near-end signal onto the subscriber loop. The second has its input interconnected to provide a signal proportional to a current on the subscriber loop, including the current proportional to the near-end signal, at its output. A summing amplifier receives signals proportional to the output voltage of the second opto-electric converter and a signal proportional to the near-end signal. The output voltage of the second opto-electric amplifier includes a component that is substantially 180° out of phase with the near-end signal, allowing the near-end signal to be cancelled at the summing amplifier.

In accordance with an aspect of the present invention, there is provided a method of extracting a far-end signal from a subscriber loop, the method includes: modulating a current proportional to a near-end signal on the subscriber loop, by way of a first optical-to electrical converter; producing a received electrical signal proportional to current through the subscriber loop, including the current proportional to the near-end signal, at an output of a second optical-to electrical converter; cancelling a contribution of the near-end signal in the received electrical signal, by adding a signal proportional to the near-end signal to the received electrical signal.

In accordance with another aspect of the present invention, there is provided a telephone line interface, including: a first opto-electric converter, having an input interconnected to receive a signal proportional to a near-end signal, and an output interconnected to modulate a current proportional to the near-end signal onto the subscriber loop; a second opto-electric converter having its input interconnected to provide a signal proportional to a current on the subscriber loop at its output; a summing amplifier, receiving a signal proportional to the output of the second opto-electric converter and a signal proportional to the near-end signal.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
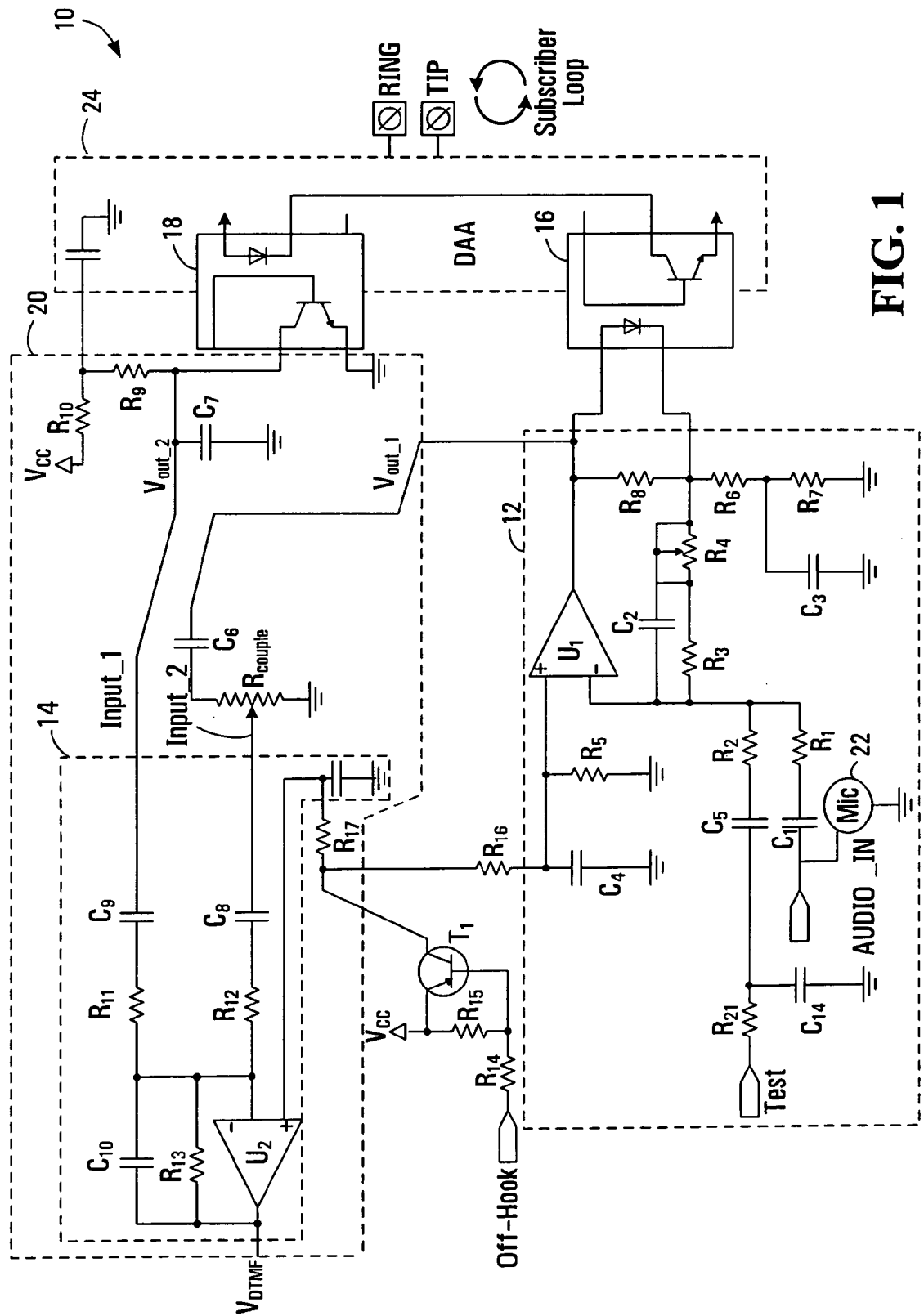
FIG. 1 is a schematic diagram of a telephone line interface and side-tone attenuation circuit exemplary of an embodiment of the present invention.

FIG. 1 illustrates a telephone line interface 10 including a side-tone attenuation circuit 20, exemplary of an embodiment of the present invention. As illustrated, telephone line interface 10 includes a buffer amplifier 12, a side-tone attenuation circuit 20 and a data access arrangement 24. Side-tone attenuation circuit 20 includes a summing amplifier 14, coupling resistor $R_{couple}$ and coupling capacitor $C_6$.

Data access arrangement ("DAA") 24 provides a data interconnection to a telephone subscriber loop at TIP and RING. DAA 24 includes first and second opto-electric converters 16 and 18 to couple signals to and from an interconnected subscriber loop. Opto-electric converters 16 and 18 are conventional opto-electric converters, and may be single or multi-transistor opto-electric converters. Each has an electrical input and output. Electrical signals presented at the input are converted to light by way of a light-emitting-diode ("LED") and produce a corresponding current in a transistor at the electric outputs.

A local microphone 22 is interconnected to the inverting input of amplifier circuit 12. Microphone 22 may be the microphone of a telephone, or a microphone of an alarm system. A near-end signal, represented as AUDIO_IN is provided by microphone 22.

As will be appreciated, amplifier circuit 12 acts as a buffer for telephone line interface 10. Amplifier circuit 12 is an inverting amplifier having a transfer function $$V_{OUT\_1} = -Z_2/Z_1[Z_4/Z_3 + 1 + Z_4/Z_2]$$

where
$Z_1 = R_1 + 1/(j\omega C_1)$
$Z_2 = (R_3 + R_4) \| 1/(j\omega C_2) = 1/[1/(R_3 + R_4) + j\omega C_2]$
$Z_3 = R_6 + [R_7 \| 1/(j\omega C_3)] = R_6 + 1/[1/(R_7) + j\omega C_3]$
$Z_4 = R_8$ The output of amplifier circuit 12 is interconnected to the input of opto-electric converter 16, which is in parallel with $R_8$. Thus, the optical diode of opto-electric converter 16 is driven by a current proportional to the signal AUDIO_IN. This, in turn, causes a current proportional to the signal AUDIO_IN to be produced at the output of opto-electric converter 16, and modulated onto the subscriber loop.

The electrical opto-electric converter 16 is also connected in series with the optical (LED) side of opto-electric converter 18 placing the LED of opto-electric converter 18 in series with the subscriber loop.

Specifically, when the telephone is in an off-hook state (communication is in progress with the monitoring station) the subscriber loop current is passed through a steering bridge (not shown) of DAA 24, keeping the polarity to the interior of the DAA correct. Current flows from the telephone line RING connection through the steering bridge to the emitter of opto-electric converter 16, through opto-electric converter 16 to the collector then to the cathode of the LED of opto-electric converter 18, through to the anode of LED of opto-electric converter 18 back to the steering bridge and out to TIP of the telephone line. The subscriber loop current is accordingly modulated by a current proportional to AUDIO_IN, providing AUDIO_IN to the far-end. Similarly, the LED of opto-electric converter 18 is also driven by the current through the subscriber loop, including a current proportional to AUDIO_IN, and any signal received on the subscriber loop from the far-end.

A current proportional to the current on the subscriber loop is thus mirrored as current at the electrical output of opto-electric converter 18. As the emitter of the electrical output transistor is connected to ground, a voltage drop proportional to the current through the subscriber loop is as $V_{OUT\_2}$ and provided to INPUT_1 of the summing inputs of amplifier 14. The component of $V_{out\_2}$ attributable to AUDIO_IN is substantially 180° out of phase with output $V_{out\_1}$ of amplifier circuit 12.

The output voltage of opto-electric converter 18 ($V_{OUT\_2}$) may be expressed mathematically as:

$$V_{OUT\_2} = -A_{opto}*(V_{FAREND} + (V'_{AUDIO\_IN}))$$

where,
$A_{opto}$=attenuation factor through opto-electric converter 18
$V_{FAREND}$=signal from far-end
$V'_{AUDIO\_IN}$=component of AUDIO_IN as both signals ($V_{FAREND}$ and $V'_{AUDIO\_IN}$) are combined in the LED of opto-electric converter 18.

$V_{FAREND}$ is a voltage proportional to the signal originating at the far-end transmitter.

Conveniently, as opto-electric converters 16, 18 are used, telephone line impedance is not reflected back into circuit 20.

$V_{out\_1}$ and $V_{out\_2}$ are provided to amplifier circuit 14, at inputs INPUT_2 and INPUT_1, respectively. $V_{out\_1}$ is provided to the summing input INPUT_2 of amplifier 14 by way of an adjustable resistor $R_{couple}$.

Amplifier circuit 14 is an inverting, summing amplifier having a transfer function $$V_{DTMF} = -Z_f \left[ \left( \frac{-V_{OUT\_2}}{Z_5} \right) + \frac{V_{OUT\_1}*R_{COUPLE\_G-W}}{Z_6 + (R_{COUPLE} + Z_{C6})} \right]$$

where:
$Z_5 = R_{11} + 1/(j\omega C_9)$
$Z_6 = R_{12} + 1/(j\omega C_8)$
$Z_f = R_{13} \| 1/j\omega C_{10} = 1/[(1/R_{13}) + j\omega C_{10}]$
$Z_{C6} = 1/j\omega C_6$
$R_{COUPLE}$=maximum value of potentiometer
$R_{COUPLE\_G-W}$=adjusted resistance between ground and wiper of adjustable potentiometer $R_{couple}$.

Amplifier circuit 14, thus sums $$V_{DTMF} = -K1*(V_{FAREND} + (-V'_{AUDIO\_IN})) + (-K2*V_{INPUT\text{-}2})$$

$$V_{DTMF} = (-K1*V_{FAREND}) + (-K1*V'_{AUDIO\_N}) + (-K2*V_{INPUT\text{-}2})$$

where,
$K1 = Z_f/Z_5$
$K2 = Z_f/Z_6$
$V'_{AUDIO\_IN}$=component of AUDIO_IN
$V_{INPUT\_2} = V_{out\_1}$ adjusted as a result of $R_{COUPLE}$
Conveniently, $R_{COUPLE}$ may be tuned so that:

$$(-K2*V_{INPUT\text{-}2}) = (-K1*-V'_{AUDIO\_IN})$$

So, with $R_{COUPLE}$ adjusted, $$V_{DTMF} = -K1*V_{FAREND},$$

effectively cancelling the presence of any component proportional to AUDIO_IN at $V_{DTMF}$.

With this configuration, attenuation levels of AUDIO_IN as low as −16 dB have been achieved. Conventional transformer based side-band attenuation circuits typically only attain attenuation levels of about 6 dB.

A DTMF decoder (not shown) and optional monitoring circuit, for example in the form of a speaker (not shown), may be interconnected to the output of amplifier circuit 14.

Circuit 20 may be turned on and off, by applying an off-hook signal (OFF_HOOK) to the base of transistor $T_1$.

Prior to use, circuit 20 is calibrated. This may be done by terminating TIP and RING terminals with an impedance of a subscriber loop and applying a test signal at test input TEST, substantially in parallel with the INPUT of amplifier 14. The test signal may be a 1000 Hz signal. Variable resistor $R_{COUPLE}$ may then be adjusted for minimum voltage at the output of amplifier 14, to null the side-tone of the transmitted signal.

Figure 2:
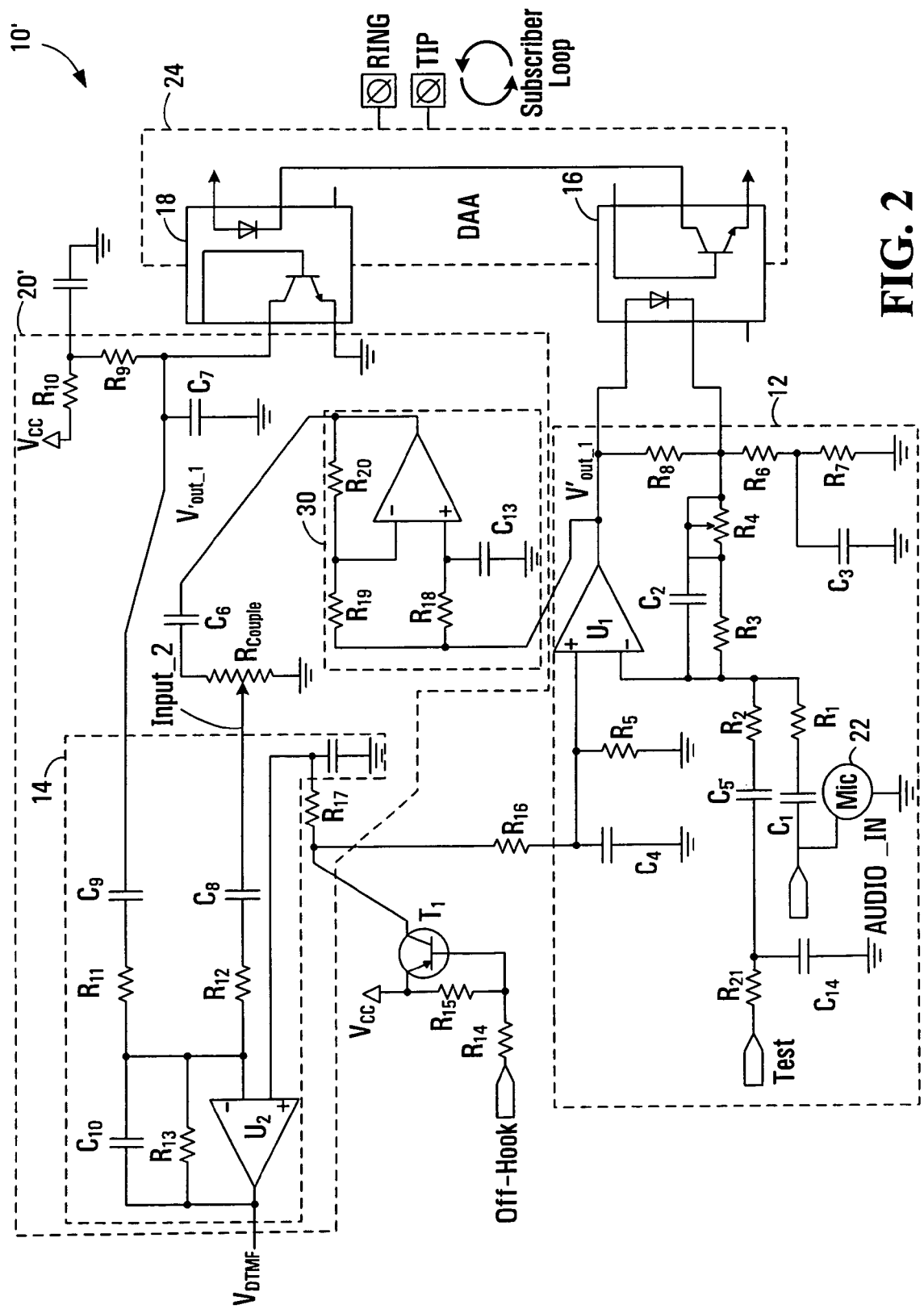
FIG. 2 is a schematic diagram of a telephone line interface and side-tone attenuation circuit exemplary of another embodiment of the present invention.

In order to reduce the frequency sensitivity of circuit 20, circuit 20 may be modified to form circuit 20' depicted in FIG. 2. Specifically, the attenuation of circuit 20' varies as the transmitted signal frequency changes due the phase shift through the opto-electric converters 16 and 18. This may be compensated for by the addition of a phase-lag circuit 30 connected between the output of amplifier 12, $V_{OUT\_1}$ and the summing input, INPUT_2 of amplifier circuit 14.

In the depicted embodiment, the values of $R_{19}$ and $R_{20}$ are chosen to be equal. This results in the output of phase-lag circuit 30 providing a 0 dB gain and a phase shift dependent only on $R_{18}$ and $C_{13}$. The phase lag angle may be represented as follows:

$$\theta = -2*\arctan(\omega*R_{18}*C_{13})$$

Therefore the signal $V'_{OUT-1}$ now has a phase angle associated with it such that the output of circuit 30 is $V'_{OUT-1} \angle -\theta$ This compensates for any additional phase shift introduced by opto-electric converters 16 and 18 and results in better attenuation of the side-tone. Typical phase shift required for best attenuation is approximately −5.4 degrees at 1 KHz.

Of course, the above described embodiments are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A method of extracting a far-end signal from a subscriber loop, said method comprising:
    modulating a current on said subscriber loop with a near-end signal by way of a first optical-to-electric converter;
    producing a received electrical signal from current through said subscriber loop, including said modulated current, at an output of a second optical-to-electric converter, by passing current through said subscriber loop through an input of said second optical-to-electric converter to produce said received electrical signal including a component substantially 180° out of phase with said near-end signal, at said output of said second optical-to-electric converter;
    cancelling a contribution of said near-end signal in said received electrical signal, by forming a weighted sum from said near-end signal said received electrical signal produced at said output of said second optical-to-electric converter.

2. The method of claim 1, wherein said cancelling comprises summing said voltage at said output of said second optical-to-electric converter and a signal formed from said near-end signal at a summing amplifier.

3. The method of claim 1, further comprising phase shifting one of said signal formed from said near-end signal and said received electrical signal prior to providing it to an input of said summing amplifier.

4. A telephone line interface, comprising:
    a first opto-electric converter, having an output interconnected to modulate a current on an interconnected subscriber loop with a near-end signal;
    a second opto-electric converter having its input interconnected to said subscriber loop to provide a signal at its output including a component substantially 180° out of phase with said near-end signal;
    a summing amplifier, to sum said signal at said output of said second opto-electric converter and a signal formed from said near-end signal to cancel a contribution of said near-end signal on said subscriber loop.

5. The telephone line interface of claim 4, further comprising an amplifier to phase shift said signal formed from said near-end signal, prior to providing said signal formed from said near-end signal to said summing amplifier.

6. The telephone line interface of claim 4, further comprising an adjustable impedance interconnected with an input of said summing amplifier so that said summing amplifier provides an output with any component of said near-end signal substantially attenuated.

7. The telephone line interface of claim 6, comprising a data access arrangement connecting said first and second opto-electric converters to said subscriber loop.

8. The telephone line interface of claim 7, wherein said input of said second opto-electric converter is interconnected in series with said output of said first opto-electric converter.

9. The telephone line interface of claim 8, wherein an output of said summing amplifier is interconnected with a DTMF decoder.

10. The telephone line interface of claim 4, further comprising an amplifier interconnected to receive said near-end signal and provide said signal formed from said near-end signal to said first opto-electric converter.

* * * * *